(12) United States Patent
Cleron et al.

(10) Patent No.: US 8,601,561 B1
(45) Date of Patent: Dec. 3, 2013

(54) INTERACTIVE OVERLAY TO PREVENT UNINTENTIONAL INPUTS

(71) Applicant: Google Inc., Mountain View, CA (US)

(72) Inventors: Michael Andrew Cleron, Menlo Park, CA (US); James Brooks Miller, Sunnyvale, CA (US); Daniel Marc Gatan Shiplacoff, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/741,098

(22) Filed: Jan. 14, 2013

Related U.S. Application Data

(60) Provisional application No. 61/703,746, filed on Sep. 20, 2012.

(51) Int. Cl.
G06F 21/00 (2013.01)

(52) U.S. Cl.
USPC .......................................................... 726/7

(58) Field of Classification Search
None
See application file for complete search history.

(56) References Cited

U.S. PATENT DOCUMENTS

| | | | | |
|---|---|---|---|---|
| 5,991,441 | A * | 11/1999 | Jourjine ........................ | 382/187 |
| 2003/0034185 | A1* | 2/2003 | Kaikuranta ................ | 178/18.01 |
| 2003/0090506 | A1* | 5/2003 | Moore et al. .................. | 345/730 |
| 2005/0048457 | A1* | 3/2005 | Ferrigno et al. .............. | 434/308 |
| 2007/0259716 | A1* | 11/2007 | Mattice et al. ................. | 463/36 |
| 2009/0135142 | A1* | 5/2009 | Fu et al. ........................ | 345/168 |
| 2010/0077292 | A1* | 3/2010 | Harris ........................... | 715/232 |
| 2010/0081502 | A1* | 4/2010 | Rasmussen et al. ............ | 463/30 |
| 2010/0125785 | A1 | 5/2010 | Moore et al. | |
| 2012/0084734 | A1* | 4/2012 | Wilairat ........................ | 715/863 |

OTHER PUBLICATIONS

"iClarified a Look at the New Lock Screen Camera Launch in iOS 5.1 [Video]," Retrieved from http://www.iclarified.com/entry/index.php?enid=20520, accessed on Aug. 31, 2012, 2 pp.

Rehman, "Add Home Screen Widgets to Android Lock Screen With Generic Lockscreen," Retrieved from http://www.addictivetips.com/mobile/add-home-screen-widgets-to-android-lock-screen-with-generic-widget-lockscreen/, accessed on Aug. 31, 2012, 3 pp.

"WidgetLocker Lockscreen, TeslaCoil Software," Retrieved from https://play.google.com/store/apps/details?id=com.teslacoilsw.widgetlocker&hl=en, accessed on Aug. 31, 2012, 2 pp.

"All in One Cydget—Live Your iPhone Lockscreen," Retrieved from http://www.ihackintosh.com/2010/01/all-in-one-cydget-live-your-iphone-lockscreen/, accessed on Aug. 31, 2012, 5 pp.

"Sweet lockscreen widget iPhone iPod," Retrieved from http://www.youtube.com/watch?v=XYnO51FsNeQ, accessed on Aug. 31, 2012, 3 pp.

(Continued)

Primary Examiner — William Goodchild
(74) Attorney, Agent, or Firm — Shumaker & Sieffert, P.A.

(57) ABSTRACT

A computing device is described that outputs for display at a presence-sensitive screen a lock screen graphical user interface. The lock screen graphical user interface includes a widget region and an unlock region. The widget region includes a widget and an overlay that at least partially obscures the widget. The computing device receives an indication of a user input and determines a characteristic of the user input. In response to determining that the determined characteristic satisfies a threshold, the computing device removes the overlay from the widget region.

18 Claims, 5 Drawing Sheets

(56) References Cited

OTHER PUBLICATIONS

"Photo library browser widget on lockscreen," Retrieved from https://www.google.com/search?q=photo+library+browser+widget+on+lockscreen&hl=en&client=firefox-a&hs=4cR&rls=org.mozilla:en-, accessed on Aug. 31, 2012, 5 pp.

"Get Sense 3.0 Lockscreen + Top 10 Best NEW Android Apps," Retrieve from http://www.youtube.com/watch?v=ees0YljGySo, accessed on Sep. 19, 2012, 3 pp.

"What if iPhone had . . . Dashboard Widgets," Retrieved from http://www.youtube.com/watch?v=7_1quYGZPvg, accessed on Sep. 19, 2012, 3 pp.

Office Action from U.S. Appl. No. 13/735,751, dated May 20, 2013, 19 pp.

Response to Office Action dated May 20, 2013, from U.S. Appl. No. 13/735,751, filed Aug. 19, 2013, 13 pp.

\* cited by examiner

INTERACTIVE OVERLAY TO PREVENT UNINTENTIONAL INPUTS

This application claims the benefit of U.S. Provisional Application No. 61/703,746, filed Sep. 20, 2012, the entire content of which is hereby incorporated by reference.

BACKGROUND

Computing devices can perform various functions, such as executing applications stored thereon and outputting information (e.g., documents, e-mails, and pictures) for display (e.g., on a screen). Certain computing devices can include a limited access state that prevents an unauthorized user from viewing and accessing applications and information stored at the computing device, thereby effectively "locking" the computing device. For example, some computing devices may require a user to provide a specific input to lock and/or unlock the device.

In addition to security, locking techniques can be useful to prevent inadvertent inputs by an otherwise authorized user. For example, the user may carry a computing device, such as a mobile phone, in a pocket. Locking techniques may prevent the computing device from performing various actions in response to detecting accidental user input (e.g., when a user accidentally presses a button, taps a touch screen, or inadvertently activates a presence-sensitive screen while the mobile phone is in the user's pocket).

While locking techniques can provide security to information and protection from accidental user inputs, locking techniques generally prevent immediate viewing and accessing of applications and information stored at the computing device. For example, when a computing device is "locked," a user must perform, at a minimum, one extra step to "unlock" the computing device before the computing device will output for display and/or permit access to, the applications and information stored at the computing device.

SUMMARY

In one example, the disclosure is directed to a method that may include outputting, by a computing device and for display at a presence-sensitive screen, a lock screen graphical user interface. The lock screen graphical user interface may include a widget region and an unlock region. The widget region may include a widget and an overlay that appears to at least partially obscure the widget. The overlay may be at least partially transparent. The method may further include receiving, by the computing device, an indication of a user input. The method may further include determining, by the computing device, a characteristic of the user input. In response to determining that the determined characteristic satisfies a threshold, the method may further include removing, by the computing device, the overlay from the widget region.

In another example, the disclosure is directed to a computing device comprising one or more processors. The one or more processors being configured to output for display at a presence-sensitive screen, a lock screen graphical user interface. The lock screen graphical user interface may include a widget region and an unlock region. The widget region may include a widget and an overlay that at least partially obscures the widget. The overlay may be at least partially transparent. The one or more processors being further configured to receive an indication of a user input. The one or more processors being further configured to determine a characteristic of the user input. In response to determining that the determined characteristic satisfies a threshold, the one or more processors being further configured to remove the overlay from the widget region.

In another example, the disclosure is directed to a computer-readable storage medium comprising instructions that, when executed configure one or more processors of a computing device to output, for display at a presence-sensitive screen, a lock screen graphical user interface. The lock screen graphical user interface may include a widget region and an unlock region. The widget region may include a widget and an overlay that at least partially obscures the widget. The overlay may be at least partially transparent. The instructions, when executed, may further configure the one or more processors of the computing device to receive an indication of a user input. The instructions, when executed, may further configure the one or more processors of the computing device to determine, a characteristic of the user input. In response to determining that the determined characteristic satisfies a threshold, the instructions, when executed, may further configure the one or more processors of the computing device to remove the overlay from the widget region.

The details of one or more examples are set forth in the accompanying drawings and the description below. Other features, objects, and advantages of the disclosure will be apparent from the description and drawings, and from the claims.

DETAILED DESCRIPTION

Examples described in this disclosure relate to techniques applied by a computing device that receives user inputs when the computing device is in a limited access state (e.g., a "locked" state). In some implementations, the computing device, while in the limited access state, can output, for display at a presence-sensitive screen, a lock screen graphical user interface that prevents access to applications and information stored at the computing device. In addition, the computing device may output, for display, an interactive widget (i.e., a specific application that performs a limited or a specific function) within a widget region of the lock screen. To prevent a user from accidentally interacting with the widget region, the computing device can output, for display, an overlay that at least partially obscures (e.g., covers, shades, overlaps, etc.) the interactive widget. For example, the computing device may present an overlay with a transparent tint so a user can view, but not interact with, the interactive widget.

Rather than require the user to first "unlock" the computing device to interact with the widget, the techniques may enable the computing device to receive a user input that causes the computing device to remove the overlay and enable the widget region to allow a user to interact with the interactive widget. For example, while presenting the overlay, the computing device may receive a particular input or combination of inputs (e.g., a particular gesture received at the presence-sensitive screen, a double tap gesture within the widget region, a shake input received at an accelerometer or gyro, or some other particular input). The computing device may determine a characteristic of the particular input and remove the overlay if the characteristic satisfies (e.g., exceeds) a threshold. With the overlay removed, the computing device may enable the interactive widget to receive user inputs (e.g., as a user interacts with the interactive widget). As such, the computing device can simultaneously operate in a limited access state and also permit a user to conveniently view and later interact with one or more widgets.

In this manner, a computing device may display, within a lock screen, an interactive widget, without compromising the benefits of locking techniques. By determining the characteristic of the user input before enabling the widget region in this way, the computing device may discern intentional from unintentional user input, and allow a user to quickly access and interact with the interactive widget from the lock screen. Such a computing device may perform fewer operations in response to unintentional user inputs and as a result, consume less electrical power.

Figure 1:
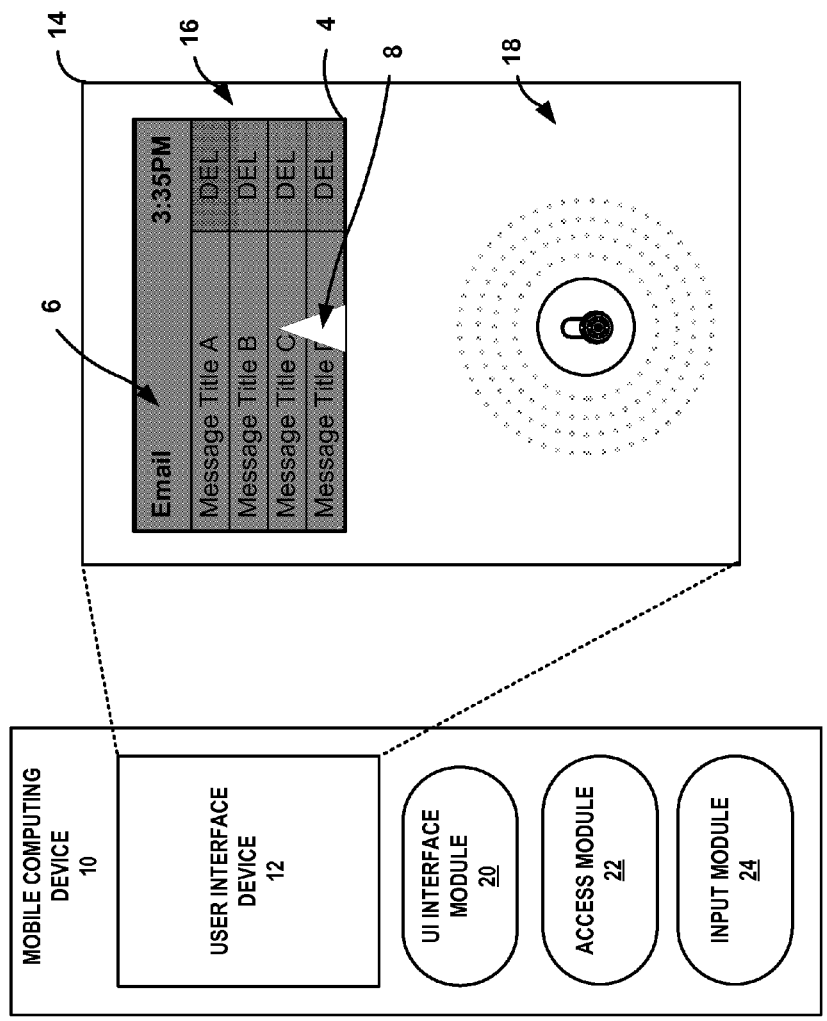
FIG. 1 is a conceptual diagram illustrating an example computing device that is configured to display a widget within a widget region of a lock screen user interface and an overlay that at least partially obscures the widget, in accordance with one or more aspects of the present disclosure.

FIG. 1 is a conceptual diagram illustrating an example computing device that is configured to display a widget within a widget region of a lock screen user interface and an overlay that at least partially obscures the widget, in accordance with one or more aspects of the present disclosure. In the example of FIG. 1, computing device 10 is a mobile phone. However, in other examples, computing device 10 may be a tablet computer, a personal digital assistant (PDA), a laptop computer, a table top computer, a portable gaming device, a portable media player, an e-book reader, a watch, or another type of computing device.

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UID 12 may function as an output device using any one or more of a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive screen that may receive tactile user input from a user of computing device 10. UID 12 may receive the tactile user input by detecting one or more taps and/or gestures from a user of computing device 10 (e.g., the user touching or pointing to one or more locations of UID 12 with a finger or a stylus pen). The presence-sensitive screen of UID 12 may present output to a user. UID 12 may present the output as a user interface which may be related to functionality provided by computing device 10. For example, UID 12 may present various functions and applications executing on computing device 10 such as an electronic message application, a map application, etc. UID 12 may present one or more widgets that perform specific functions or access a specific service on computing device 10.

Computing device 10 may include user interface ("UI") module 20, access module 22, and input module 24. Modules 20, 22, and 24 may perform operations described herein using software, hardware, firmware, or a mixture of firmware, hardware, and software residing in, and executing on, computing device 10. Computing device 10 may execute modules 20, 22, and 24 with multiple processors. Computing device 10 may execute modules 20, 22, and 24 as a virtual machine executing on underlying hardware.

UI module 20 may cause UID 12 to present lock screen graphical user interface 14 "user interface 14" while computing device 10 operates in a limited access state. User interface 14 includes graphical elements displayed at various locations of UID 12. FIG. 1 illustrates two different regions of user interface 14. Widget region 16 of user interface 14 and unlock region 18 of user interface 14 each include graphical elements related to different functionality of computing device 10. For example, widget region 16 includes overlay 4 that at least partially obscures widget 6. Unlock region 18 includes graphical elements related to an unlock function of computing device 10.

Unlock region 18 includes graphical elements related to unlocking computing device 10 when computing device 10 operates in a limited access state. For example, as described in more detail below, a user may input a gesture at a location of the presence-sensitive screen of UID 12 that presents unlock region 18. Based on the gesture, computing device 10 may exit the limited access state and transition to a state that allows the user access to information and applications stored on computing device 10.

Widget region 16 includes widget 6 and overlay 4 that at least partially obscures widget 6. In some examples, such as the example of FIG. 1, overlay 4 may be at least partially transparent. Widget 6 represents a component of user interface 14 from which a user can perform a function, execute an application, or access a service using computing device 10. In some examples, widget 6 may be a customizable widget from a widget repository (e.g., downloaded to computing device 10 from the Internet).

For example, FIG. 1 illustrates widget 6 as an electronic mail (e-mail) widget that causes UID 12 to present at a presence-sensitive screen, message titles of e-mail messages received by computing device 10. Examples of widget 6 may include a variety of widgets that each represent a component of user interface 14 from which a user can perform a specific function or accesses a specific service on computing device 10. For example, widget 6 may include a weather forecast widget, a notification widget, a simple messaging service (SMS) message widget, a clock widget, a calendar widget, an electronic media player widget, etc. Computing device 10 may allow a user or developer to customize widget 6 or download and install widget 6 from a widget repository (e.g., located on the Internet) onto computing device 10.

Input module 24 of computing device 10 may receive information about an indication of a user input received by computing device 10 and determine a type and a characteristic of the user input. For example, computing device 10 may receive various types of user inputs, such as a gesture input, detected by a presence-sensitive screen of UID 12, a button input, detected by push button or a physical switch of computing device 10, and a sensor input, detected by a sensor of computing device 10 (e.g., an accelerometer, a gyro, a proximity sensor, an ambient light sensor, a compass, a barometer, etc.). Input module 24 may determine a characteristic for each type of input. For example, a characteristic of a gesture input detected by a presence-sensitive screen may include a length component, a velocity component, and a start location component. A characteristic of a button input detected by a physical switch may include the state of the switch (e.g., on, off, in-between, etc.). A characteristic of a sensor input detected by a sensor may include an acceleration of computing device 10, an orientation of computing device 10, a physical distance away from computing device 10, a luminance of light surrounding computing device 10, an ambient pressure reading around computing device 10, etc.) Input module 24 may receive information about an indication of a user input received by computing device 10 and determine a characteristic of the user input based on the information and the type of user input.

Input module 24 may receive information from computing device 10 about an indication of a user input and determine the user input corresponds to a gesture performed at the presence-sensitive screen of UID 12 (e.g., after a user swipes and/or taps a finger or a stylus pen at a location of the presence-sensitive screen of UID 12). Input module 24 may determine a characteristic of the gesture user input, such as a start location, a length, a velocity, an acceleration, a tapping frequency, a shape, etc.

Input module 24 may receive information from a button or a physical switch of computing device 10 about an indication of a user input and determine the user input corresponds to a button input detected by a push button or a physical switch of computing device 10. Input module 24 may determine a characteristic of the button input, such as a physical switch state (e.g., on, off, etc.).

Input module 24 may receive information about an indication of a user input from a sensor of computing device 10 and determine the user input corresponds to a sensor input detected by a sensor of computing device 10. Input module 24 may determine a characteristic of the sensor user input, such as an acceleration reading from an accelerometer (e.g., when the user shakes computing device 10), an orientation reading from a gyro (e.g., when a user changes the orientation of computing device 10 from portrait to landscape orientation), an ambient light measurement from an ambient light sensor (e.g., when a user removes computing device 10 from a pocket), a physical distance reading from a proximity sensor between an object (e.g., a hand of a user) and computing device 10, and a barometric pressure reading from a barometer.

Access module 22 may control access to applications and information stored on computing device 10. For example, while computing device 10 operates in a limited access state and UI module 20 may cause UID 12 to present user interface 14. Access module 22 may determine, based on a user input detected by input module 24, whether to cause computing device 10 to exit the limited access state or to remain in the limited access state. For example, input module 24 may determine from information received by UID 12 that the user input represents a gesture. Input module 24 may determine that a start location of the gesture corresponds to a location at the presence-sensitive screen of UID 12 that presents unlock region 18. Based on the start location of the gesture and a characteristic of the gesture determined by input module 24, access module 22 may determine that the gesture represents a user input to unlock computing device 10. Access module 22 may cause computing device 10 to exit the limited access state and transition to a different state from which the user can access protected information and applications stored on computing device 10.

Conversely, input module 24 may determine a start location of the user input corresponds to a location at the presence-sensitive screen of UID 12 that presents widget region 16 or some other location at the presence-sensitive screen of UID 12 other than a location where UID 12 presents unlock region 18. Access module 22 may determine that the gesture does not represent a user input to unlock computing device 10 and in response, access module 22 may cause computing device 10 to remain in the limited access state from which the user cannot access protected information and applications stored on computing device 10.

In one example, UI module 20 may cause UID 12 to present user interface 14 for display at a presence-sensitive screen. UI module 20 may include widget 6 (e.g., an e-mail widget) in widget region 16. UI module 20 may include overlay 4 that at least partially obscures widget 6. While computing device 10 presents user interface 14, input module 24 of computing device 10 may receive information from computing device 10 about an indication of a user input received by computing device 10. Based on information about the user input, input module 24 may determine a characteristic of the user input.

For example, based on the information about the user input received from computing device 10, input module 24 may determine the user input represents a gesture detected by UID 12 at a location on the presence-sensitive screen of UID 12. Input module 24 may determine a characteristic of the gesture input. The characteristic of the gesture input may include several properties that characterize the user input, such as a length of the user input (e.g., equivalent to a distance equal to two-thirds of the width of the presence-sensitive screen of UID 12), a shape of the user input (e.g., a horizontal linear shape), a velocity of the user input (e.g., a ratio of the length of the user input and an duration of time associated with the user input), etc.

Computing device 10 may use the characteristic of the user input to differentiate accidental user input from intentional user input. Computing device 10 may update user interface 14 and remove overlay 4 upon the detection of intentional user input, but may not update user interface 14 upon the detection accidental user input. To identify intentional user input versus accidental user input, UI module 20 may compare the characteristic of the user input to a threshold and, if the characteristic satisfies the threshold, computing device 10 may determine the user input represents intentional user input.

For example, in the case of a gesture user input, the threshold may include one or more categorical thresholds (e.g., components) that correspond to different aspects of a characteristic of a user input. The threshold may include a start location component (e.g. corresponding to a location at the presence-sensitive screen of UID 12 that presents white triangle 8 of overlay 4 within widget region 16), a shape component (e.g., a common linear plane between eighty percent of each of the location components in the sequence of motion events), a velocity component (e.g., fifty percent of the screen width divided by a half second), a length component (e.g., fifty percent of the width of the presence-sensitive screen of UID 12), and an acceleration component (e.g., a positive acceleration, a value of +1, etc.).

Each threshold component may represent a value that UI module 20 can compare the characteristic of the user input against to determine whether the characteristic of the user input satisfies the threshold. For instance, UI module 20 may determine the start location of the user input approximately corresponds to the location component of the threshold, for instance, if the location of the user input is within overlay 4. UI module 20 may determine the length of the user input satisfies the length component of the threshold. UI module 20 may determine the velocity of the user input satisfies the velocity component of the threshold, etc. UI module 20 may determine the characteristic of the user input satisfies (e.g., exceeds) each component of the threshold. In response, UI module 20 may determine, based on the characteristic of the user input, that the characteristic satisfies the threshold.

To enable interaction with widget 6 of widget region 16, UI module 20 may require that the characteristic of the user input satisfies the threshold. This requirement may require that a user provide a user input with a specific momentum, inertia, or force before computing device 10 enables interaction with widget 6. The characteristic of an accidental user input may not satisfy the threshold or each component of the threshold. For example, an accidental gesture user input may move slowly across the presence-sensitive screen of UID 12 and may not satisfy the velocity component of the threshold. An accidental sensor user input may shake computing device 10, but not shake computing device 10 with enough force to satisfy an acceleration and/or orientation component of the threshold. By requiring that the characteristic of the user input to satisfy each component of the threshold, UI module 20 may not remove overlay 4 from widget region 16 of user interface 14 in response to accidental user input.

In response to determining that the characteristic satisfies the threshold, UI module 20 may cause computing device 10 to remove overlay 4 from widget region 16 of user interface 14 and allow a user to interact with widget 6 of widget region 16 (e.g., by providing user input at a location where the presence-sensitive screen of UID 12 presents widget 6). For example, if UI module 20 determines the characteristic of the gesture input represents an intentional user input with a start location, a length, a shape, a velocity, and an acceleration that satisfy each respective component of the threshold, UI module 20 may cause UID 12 to present user interface 14 by slide transitioning overlay 4 out of widget region 16 and retaining widget 6 within widget region 16. Furthermore, because access module 22 did not determine that the user input represented a user input to unlock computing device 10, UI module 20 may continue to cause UID 12 to output lock screen graphical interface 14 including unlock region 18.

In this way, computing device 10 may present a widget, such as widget 6, in a lock screen graphical user interface. Upon detection of intentional user input, computing device 10 may cause UID 12 to allow write-access to the widget presented in the lock screen graphical user interface. In addition and despite the user input, computing device 10 may remain in a limited access state and prevent the user from accessing information and applications (other than the widget) stored on computing device 10. By presenting an overlay (that sometimes is at least partially transparent) at least partially obscuring a widget, a user can quickly inspect content within the widget while computing device 10 continues to protect the content within the widget from accidental user input.

Figure 2:
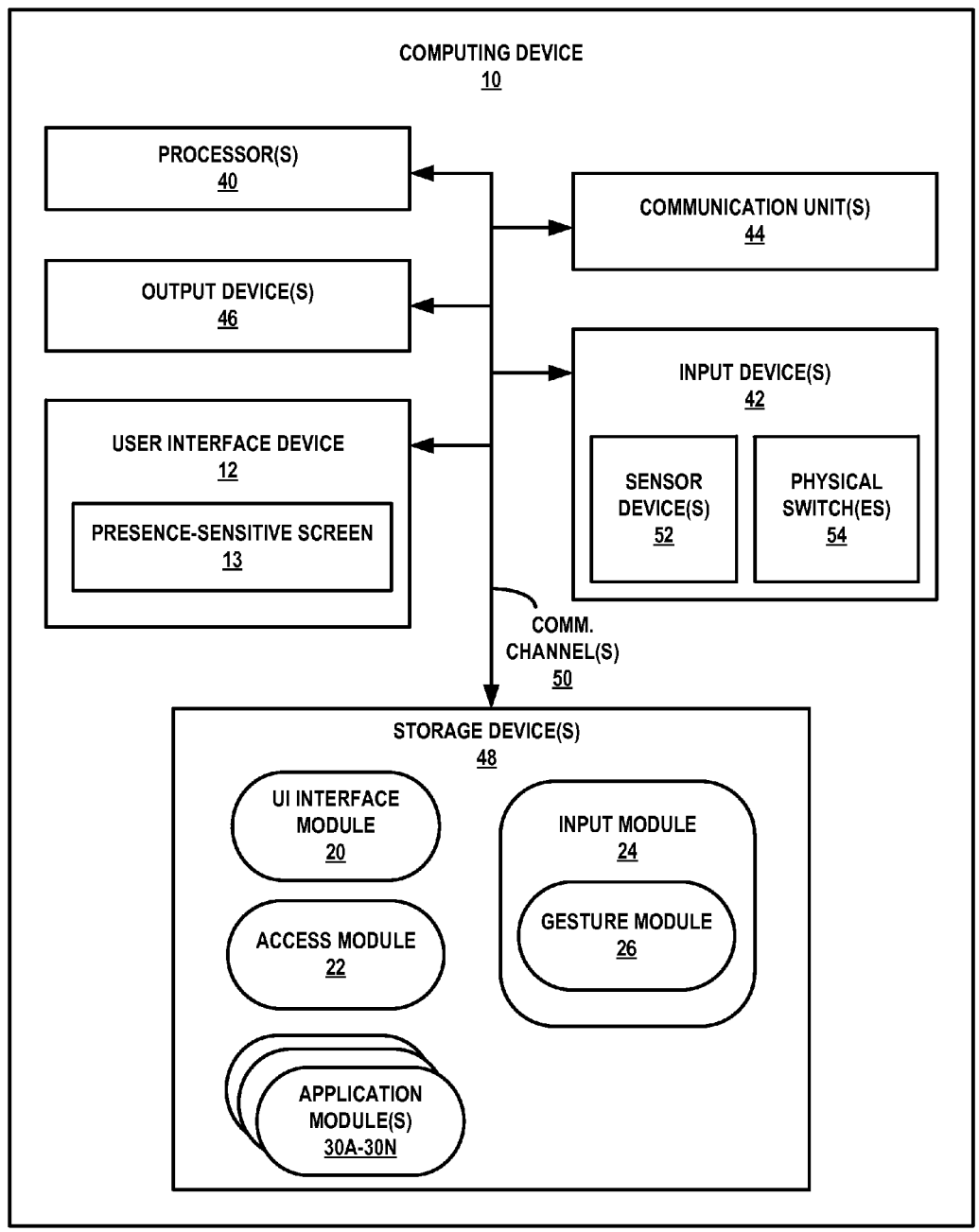
FIG. 2 is a block diagram illustrating an example computing device, in accordance with one or more aspects of the present disclosure.

FIG. 2 is a block diagram illustrating an example computing device, in accordance with one or more aspects of the present disclosure. Computing device 10 of FIG. 2 is described below within the context of FIG. 1. Although shown in FIGS. 1 and 2 as a stand-alone computing device 10 for purposes of example, computing device 10 may be any component or system that includes one or more processors (e.g., one or more processors 40) or other suitable computing environment for executing software instructions, and, for example, need not include one or more of the elements shown in these figures (e.g., user interface device 12, presence-sensitive-screen 13).

As shown in the example of FIG. 2, computing device 10 includes user interface device 12 ("UID 12"), one or more processors 40, one or more input devices 42, one or more communication units 44, one or more output devices 46, and one or more storage devices 48. In this example, UID 12 also includes presence-sensitive screen 13. Input devices 42 also include sensor devices 52 and physical switches 54. Storage devices 48 of computing device 10 also include UI module 20, access module 22, input module 24, and application modules 30A-30N (collectively referred to as "application modules 30"). Input module 24 also includes gesture module 26. Communication channels 50 may interconnect each of the components 12, 13, 20, 22, 24, 26, 30, 40, 42, 44, 46, 52, and 54 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes presence-sensitive screen 13, a touch-sensitive screen, mouse, keyboard, voice responsive system, video camera, microphone or any other type of device for detecting input from a human or machine. Input devices 42 also include sensor devices 52 and physical switches 54. Sensor devices 52, in one example, include an accelerometer, a gyro, a proximity sensor, an ambient light sensor, a barometer, or any other device for detecting a sensor input. Physical switches 54, in one example, includes a push button switch, a lever switch, a three-phase switch, a multi-state switch, a dial, or any other physical switch.

One or more output devices 46 of computing device 10 may generate output. Examples of output are tactile, audio, and video output. Output devices 46 of computing device 10, in one example, includes presence-sensitive screen 13, a sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to transmit and/or receive radio signals on a radio network such as a cellular radio network. Likewise, communication units 44 may transmit and/or receive satellite signals on a satellite network such as a GPS network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers.

UID 12 of FIG. 2 includes presence-sensitive screen 13 (hereafter "screen 13"). Computing device 10 may use UID 12 as an input device and an output device. For example, screen 13 of UID 12 may include a touchscreen configured to receive tactile user input from a user of computing device 10. Screen 13 of UID 12 may also include an LED display capable of outputting visible information to the user of computing device 10. UID 12 may present a user interface on screen 13, such as user interface 14 of FIG. 1, and other various functions and applications executing on computing device 10.

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor or a projector that shares a wired and/or wireless data path with a tablet computer).

Application modules 30 of computing device 10 may each perform various functions or access one or more services for computing device 10. Each of application modules 30 may represent the engine executing on computing device 10 that performs the specific functions associated with a widget, such as widget 6 (e.g., e-mail retrieval, deletion, editing, etc.). In other words, widget 6 of FIG. 1 may correspond to executable application module 30A that performs e-mail management functions (e.g., displaying, sending, editing, and deleting e-mail messages) for computing device 10. When UI module 20 includes widget 6 in user interface 14, UI module 20 may request and receive formatted data from application module 30A associated with widget 6 (e.g., subject headings to four recently received e-mail messages).

One or more storage devices 48 within computing device 10 may store information required for use during operation of computing device 10 (e.g., application modules 30 of computing device 10 may store e-mail messages accessed by application modules 30 during execution on computing device 10). Storage devices 48, in some examples, have the primary purpose of being short term and not long-term computer-readable storage mediums. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with UI module 20, access module 22, input module 24, gesture module 26, and application modules 30.

One or more processors 40 may implement functionality and/or execute instructions within computing device 10. For example, processors 40 on computing device 10 may receive and execute instructions stored by storage devices 48 that execute the functionality of UI module 20, access module 22, input module 24, gesture module 26, and application modules 30. These instructions executed by processors 40 may cause computing device 10 to store information, within storage devices 48 during program execution. Processors 40 may execute instructions of modules 20-30 to cause UID 12 to present lock screen graphical user interface 14 with widget region 16 and unlock region 18 on screen 13. That is, modules 20-30 may be operable by processors 40 to perform various actions, including detecting user input and causing UID 12 to present a user interface on screen 13, such as user interface 14 of FIG. 1.

In accordance with aspects of this disclosure computing device 10 of FIG. 2 may output lock screen graphical user interface 14. A user can access widget 6 while computing device 10 remains in a limited access state by first providing intentional user input to computing device 10, such as user input at a location of screen 13 where screen 13 presents widget region 16. Examples of intentional user input include providing a gesture at a specific location of screen 13, initiating a gesture at a specific point of screen 13, providing a gesture with a minimum length, velocity, acceleration, tap frequency, or shape at a specific location of screen 13, shaking computing device 10, changing the orientation of computing device 10, etc.

The intentional user input may cause computing device 10 to remove overlay 4 that at least partially obscures widget 6. Overlay 4 may be at least partially transparent. In that case, a user may view widget 6 presented at screen 13 even though overlay 4 may appear to cover widget 6. As long as computing device 10 presents overlay 4 at screen 13, overlay 4 may prevent a user from interacting with widget 6 (e.g., by preventing the user from providing inputs to widget 6).

For instance, UI module 20 of computing device 10 may cause UID 12 to output user interface 14 of FIG. 1 at screen 13, which includes widget region 16, widget 6, overlay 4, and unlock region 18. UI module 20 may send information about user interface 14 over communication channels 50. UID 12 may receive the information about user interface 14 and present user interface 14 including widget region 16, widget 6, overlay 4, and unlock region 18 on screen 13.

In one example, widget 6 may correspond to application module 30A that functions as an e-mail client application. When UI module 20 includes widget 6 as part of user interface 14, UI module 20 may receive application information from application module 30A over communication channels 50. UI module 20 may analyze the application information and based on the information, UI module 20 may update user interface 14. For example, UI module 20 may receive application information from application module 30A that causes UI module 20 to update a list of recently received e-mails included as content within widget 6 at screen 13.

UI module 20 may include overlay 4 that at least partially obscures widget region 16 and the entire contents of widget 6. Overlay 4 may be at least partially transparent. Overlay 4, in effect, may disable write access to widget 6 from user input detected at a location of screen 13 that presents the content of widget 6. In other words, overlay 4 may cover widget 6 so that a user may view content within widget 6 but may not immediately interact with widget 6.

Computing device 10 may receive an indication of a user input and input module 24 may analyze information about the user input to determine an input type and a characteristic of the user input. For example, UID 12 may detect a user input at screen 13. UID 12 may send information corresponding to the user input over communication channels 50 to input module 24. Input module 24 may determine from the information that the user input corresponds to a gesture input, based on an indication that the information was transmitted to input module 24 from UID 12. Similarly, one of sensor device 52 may detect a user input, for example a shake detected by an accelerometer of computing device 10. Input module 24 may receive information about the user input over communication channels 50 and determine that the user input corresponds to a sensor input based on an indication that the information was transmitted to input module 24 from one of sensor devices 52. Likewise, one of physical switches 54 may detect a user input, for example a press of a button switch of computing device 10. Input module 24 may receive information about the user input over communication channels 50 and determine that the user input corresponds to a button input based on an indication that the information was transmitted to input module 24 from one of physical switches 54.

In the case when user input corresponds to a gesture input, input module 24 may call on gesture module 26 to determine a characteristic of the user input. Input module 24 may pass the information received from UID 12 to gesture module 26 to determine the characteristic of the gesture input. From the information, gesture module 26 may confirm the user input represents a gesture. Gesture module 26 may determine a start location of the gesture input and a current length of the gesture input. The start location of the gesture input may correspond to a location on screen 13 that presents widget region 16. More specifically, the start location of the gesture input may approximate a location on screen 13 that presents white triangle 8 of overlay 4 illustrated in FIG. 1. Gesture module 26 may determine the characteristic of the gesture input includes a shape component, a length component, a velocity component, and an acceleration component.

For example, UID 12 may virtually overlay a grid of coordinates onto screen 13. The grid may assign a coordinate that includes a horizontal component (X) and a vertical component (Y) to each location. Each time UID 12 detects user input at screen 13, gesture module 26 may receive information from UID 12. The information may include one or more coordinate locations and associated times indicating to gesture module 26 both, where UID 12 detects user input on the presence-sensitive screen, and when UID 12 detects user input.

Gesture module 26 may assemble the information received from UID 12 into a time-ordered sequence of motion events. Each motion event in the sequence may include a location component as the coordinate location of the user input, a time component as the time associated with the user input, and an action component. The action component may indicate whether the motion event corresponds to a push down at screen 13 or a lift up at screen 13.

Gesture module 26 may determine the action component of the first motion event in the sequence corresponds to a push down event. Gesture module 26 may determine the action component of a current motion event in the sequence (different from and subsequent to the first motion event) based on a previous motion event in the sequence. Gesture module 26 may compare the time and location components of the current motion event with the time and location components of a previous motion event. Gesture module 26 may determine that a large difference in time and/or distance (e.g., 10 milliseconds and/or 10 pixels) between two motion events indicates a lift up event, followed by a push down event. Gesture module 26 may identify a start location of a gesture as the location component of a first motion event in the sequence with a push down action component. Gesture module 26 may identify an end location of a gesture as the location component of a first motion event in the sequence with a lift up action component. Gesture module 26 may identify a start location of a second subsequent gesture as the location component of a first motion event in the sequence with a push down action component that follows a motion event in the sequence with a lift up action component. Based on the sequence of motion events, gesture module 26 may determine the user input corresponds to a gesture and may determine a characteristic of the user input including a length, a shape, a velocity, and an acceleration.

Gesture module 26 may determine, based at least in part on the location components of the motion events in the sequence of motion events, the length of the determined characteristic of the gesture. For example, gesture module 26 may determine the length of the gesture as a summation of distances between the location components of each consecutive pair of motion events in the sequence. Gesture module 26 may determine a length of a gesture before detecting an end of the gesture. For example, the length of a gesture may increase as the location components of motion events in the sequence move away from the start of the gesture. And prior to the end of the gesture, the length of the gesture may decrease as the location components of the motion events in the sequence move toward the start location of the gesture.

Gesture module 26 may determine a shape of a gesture as a linear shape, an arc shape, etc. Gesture module 26 may determine the shape of the gesture as a linear shape by analyzing the locations of the motion events in the sequence and determining a common linear plane associated with each location of the motion events on screen 13. Gesture module 26 may determine a common linear plane between ninety percent of the locations of the motion events in the sequence and determine the locations sufficiently approximate a linear shape. Gesture module 26 may further differentiate between a horizontal linear shape and a vertical linear shape (e.g., by identifying the common linear between the locations to correspond to horizontal or vertical locations on the presence-sensitive screen).

Gesture module 26 may determine the shape of the gesture as an arc shape by analyzing the locations of the motion events in the sequence and determine a common centroid point on the presence-sensitive screen and common distance (i.e., radius) from the centroid point to the locations of each motion event. Gesture module 26 may determine a common centroid and distance between ninety percent of the locations of the motion events in the sequence and determine the locations sufficiently approximate an arc shape.

Gesture module 26 may determine the velocity of the determined characteristic of the gesture based on a ratio between the length of the determined characteristic of the user input and a difference in time between the time components of the last motion event and the first motion event in the sequence. In other words, gesture module 26 may determine an elapsed time of the gesture based on a difference in time between the time components of the first and last motion events in the sequence. Gesture module 26 may determine the velocity (e.g., speed) of the gesture as being a ration between the length of the gesture and the elapsed time of the gesture.

Gesture module 26 may determine an acceleration of the gesture by analyzing each of the motion events in the sequence to determine a change in velocity (e.g., speed) between successive motion events in the sequence over the elapsed time period of the gesture. For example, gesture module 26 may determine an elapsed time and a distance on the presence-sensitive screen between two motion events. Gesture module 26 may determine the velocity between these two motion events in a manner described above. Gesture detect module may determine the velocity between each successive pair of motion events in the sequence (e.g., velocity between a first and second motion event, a velocity between a second and third motion event, etc.). Gesture module 26 may analyze the velocity between each successive pair of motion events and determine a delta between velocities consecutive successive pairs (e.g., delta between the velocity of the first and second motion events and the velocity of the second and third motion events). Gesture module 26 may determine the acceleration of the gesture during the elapsed time as being the average delta between velocities of consecutive successive pairs of motion events in the sequence. Gesture module 26 may determine the gesture has a positive acceleration that increases in velocity over time, a negative acceleration that decreases in velocity over time, or a zero acceleration with a velocity that remains constant.

In the case when the gesture represents a multiple tap input (e.g., a double tap gesture) gesture module 26 may determine a tap frequency of the user input. For example, from the time, action, and location components of each motion event in the sequence, gesture module 26 may determine a quantity of tap inputs received within a predefined area of screen 13. Gesture module 26 may determine the tap frequency of the user input based on a ratio between the quantity of tap inputs and a difference in time between the time components of the last motion event and the first motion event in the sequence.

To determine the characteristic of the gesture input on behalf of input module 24, gesture module 26 may analyze the information received from UID 12 about the user input. Gesture module 26 may assemble the information into a sequence of motion events, each with a location component, a time component, and an action component. Based on the sequence of motion events, gesture module 26 may determine the length of the user input spans a distance equal to two-thirds of the width of screen 13. Gesture module 26 may determine the shape of the user input represents a linear shape by finding a common linear plane between ninety percent of each of the location components in the sequence of motion events. Gesture module 26 may determine the velocity of the user input as the length of the user input divided by an elapsed time associated with the user input (two-thirds of the screen width divided by a half second, etc.). Gesture module 26 may determine the acceleration of the user input as the average delta in velocity between consecutive, successive pairs of motion events in the sequence during the elapsed time. Gesture module 26 may assign an acceleration value (e.g., +1, 0, or −1) to the user input to indicate positive acceleration, no acceleration, or negative acceleration.

Similarly, one of sensor device 52 may detect a user input, for example a shake detected by an accelerometer of computing device 10. Input module 24 may receive information about the user input over communication channels 50 and determine that the user input corresponds to a sensor input because the input module 24 received the information from one of sensor devices 52. Likewise, one of physical switches 54 may detect a user input, for example a press of a button switch of computing device 10. Input module 24 may receive information about the user input over communication channels 50 and determine, because the one of physical switches 54 sent the information, that the user input corresponds to a button input.

Input module 24 may determine a characteristic of the user input, when the type of the user input is a sensor input, by analyzing the information received from about the user input. For example, in addition to receiving information that identifies which sensor device 52 the user input information is from, input module 24 may determine one or more sensor values from the information that indicate an acceleration of computing device 10, an orientation of computing device 10, an ambient light measurement within a predefined distance from computing device 10, a physical distance between an object and computing device 10, and a barometric pressure reading. These sensor values may represent the characteristic of a sensor user input.

Input module 24 may determine a characteristic of the user input, when the type of the user input is a button input, by analyzing the information received from about the user input. For example, in addition to receiving information that identifies which physical switch 54 the user input information is from, input module 24 may determine from the information about the user input a state of the physical switch (e.g., on, off, third state, etc.). These physical switch states may represent the characteristic of a button input.

In response to user input module 24 analyzing the user input, UI module 20 may determine if the characteristic of the user input satisfies a threshold. In other words, based on the characteristic of the user input (e.g., the length, the shape, the velocity, the acceleration, the orientation, the state of a switch, the tap frequency, etc.), UI module 20 may determine if the user input satisfies a threshold for equating the user input with an intentional input to cause computing device 10 to remove overlay 4 from user interface 14. The threshold used by UI module 20 may vary by the type of user input received and may include multiple components or sub-thresholds. For instance, in the case of a gesture input type, the threshold used by UI module 20 may include a length component, a shape component, a velocity component, an acceleration component, and a tap frequency component (e.g., a length threshold, a shape threshold, a velocity threshold, an acceleration threshold, and a tap frequency threshold).

In the case of a sensor input type (e.g., received from one of sensor devices 52), the threshold user by UI module 20 may include an acceleration component, an orientation component, a luminance component, etc. In the case of a physical switch user input, the threshold may include a state component. UI module 20 may require the characteristic of the user input to satisfy the component value of the corresponding threshold before UI module 20 modifies or updates user interface 14 by removing overlay 4.

For example, in the case of a gesture user input, UI module 20 may receive an indication from input module 24 that the input received by computing device 10 corresponds to a gesture type. UI module 20 may compare the length of the user input to a length threshold (e.g., fifty percent of the width of screen 13). UI module 20 may compare the characteristic of the gesture input to each threshold component and determine the characteristic satisfies the threshold. In other words, UI module 20 may determine the length of the determined characteristic of the user input satisfies the length threshold and UI module 20 may determine the velocity of the determined characteristic of the user input satisfies the velocity threshold.

UI module 20 may require the characteristic of the user input to satisfy this threshold to ensure the user input represents an intentional input from the user to remove overlay 4 from in front of widget 6. A user input that does not have a characteristic that satisfies this threshold may have no effect on the appearance of user interface 14 as presented on screen 13. In any event, responsive to determining that the characteristic satisfies the threshold set by UI module 20, UI module 20 may remove overlay 4 from user interface 14 and cause UID 12 to output an updated widget region 16 of user interface 14 that removes overlay 4.

When removing overlay 4, computing device 10 may generate a visual indication to a user of the removal. For instance, UI module 20 may cause UID 12 to output for display at screen 13, at least one of a slide transition, a vertical blinds transition, a broken glass transition, and a fade transition. UI module 20 may cause overlay 4 to disappear from view using one or more of these transitions.

After removing overlay 4 from widget region 16, UI module 20 may enable widget region 16 to allow a user to interact with widget 6. And although the user can interact with widget 6, computing device 10 may continue to operate in the limited access state after removing overlay 4 from widget region 16. Thus computing device 10 provides convenient access to widget region 16 while maintaining protection for data stored at computing device 10 while in the limited access state.

Computing device 10 may however transition from the limited access state to a full access state after receiving an indication of a user input (e.g., a gesture) at a location of screen 13 within unlock region 18. For instance, computing device 10 may receive an indication of a user input and input module 24 may analyze information about the user input to determine an input type and a characteristic of the user input. Input module 24 may determine from the information that the user input corresponds to a gesture input received at screen 13. Input module 24, may call on gesture module 26 to determine a characteristic of the user input. Gesture module 26 may determine a start location of the gesture input in addition to other characteristics of the gesture input. The start location of the gesture input may correspond to a location at screen 13 that presents unlock region 18.

Access module 22 may receive information about the gesture input and determine the gesture input represents a command from a user to unlock computing device 10. Responsive to receiving the indication of the gesture input, access module 22 may cause computing device 10 to transition from the limited access state to a full access state. From the full access state, computing device 10 may enable access to previously protected data and information stored at computing device 10.

Computing device 10 may present overlay 4 within widget region 16 depending on a widget type of widget 6. For instance, UI module 20 may determine widget 6 represents a non-interactive widget or a limited interactive widget (e.g., a clock widget or the like and not affected by unintentional input). In this case, overlay 4 may be unnecessary to protect widget region 16 from unintentional user input (e.g., since accidental input at a clock widget or a media player widget may not permanently alter protected data stored at computing device 10). Responsive to determining that widget 6 represents a non-interactive widget or a limited interactive widget, UI module 20 may refrain from causing UID 12 to output for display overlay 4 within widget region 16.

To assist a user in how to cause computing device 10 to remove overlay 4 from widget region 16, computing device 10 may present instructions at screen 13 for removing overlay 4. In some examples, computing device 10 may present written instructions (e.g., text) displayed at screen 13 or some other visual indication at screen 13 (e.g., a moving object) to indicate types of user input that may cause computing device 10 to remove overlay 4. For example, while the user input is being received by UID 12, UI module 20 may cause computing device 10 to output, for display at screen 13, a visual indication of a suggested input. A feature of the suggested input may correspond to the characteristic of the user input that satisfies the threshold. The feature of the suggested input may include at least one of a length, a shape, a velocity, and an acceleration. In other words, from a point in time when UID 12 begins detecting a gesture, UI module 20 may cause screen 13 to present a moving graphical element (e.g., a circle, a dot) that travels at a location and with a speed and direction. The speed, direction, and location of the moving graphical element may roughly approximate a speed, direction and a location of a gesture input that may cause UI module 20 to remove overlay 4 from widget region 16.

FIGS. 3A-3D are conceptual diagrams illustrating example graphical user interfaces for presenting a widget within a widget region of a lock screen user interface and an overlay that at least partially obscures the widget, in accordance with one or more aspects of the present disclosure. FIGS. 3A-3D are described below within the context of computing device 10 of FIG. 1 and FIG. 2. For example, computing device 10 may present user interfaces 310A-310D as shown in the examples of FIGS. 3A-3D.

Figure 3B:
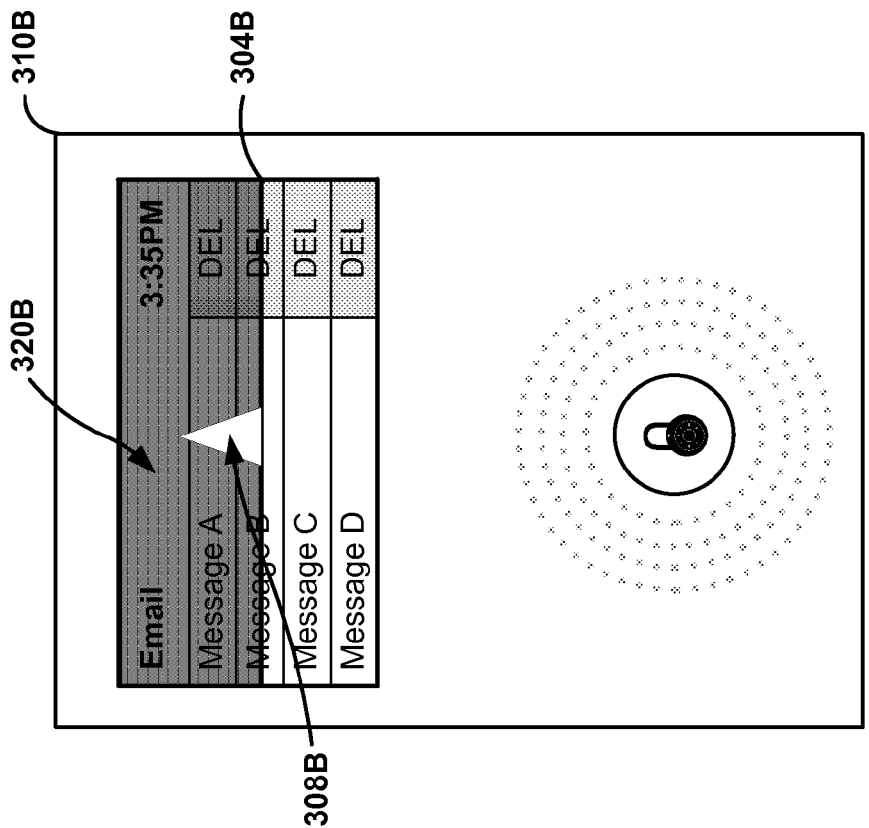
FIGS. 3A-3D are conceptual diagrams illustrating example graphical user interfaces for presenting a widget within a widget region of a lock screen user interface and an overlay that at least partially obscures the widget, in accordance with one or more aspects of the present disclosure
Figure 3A:
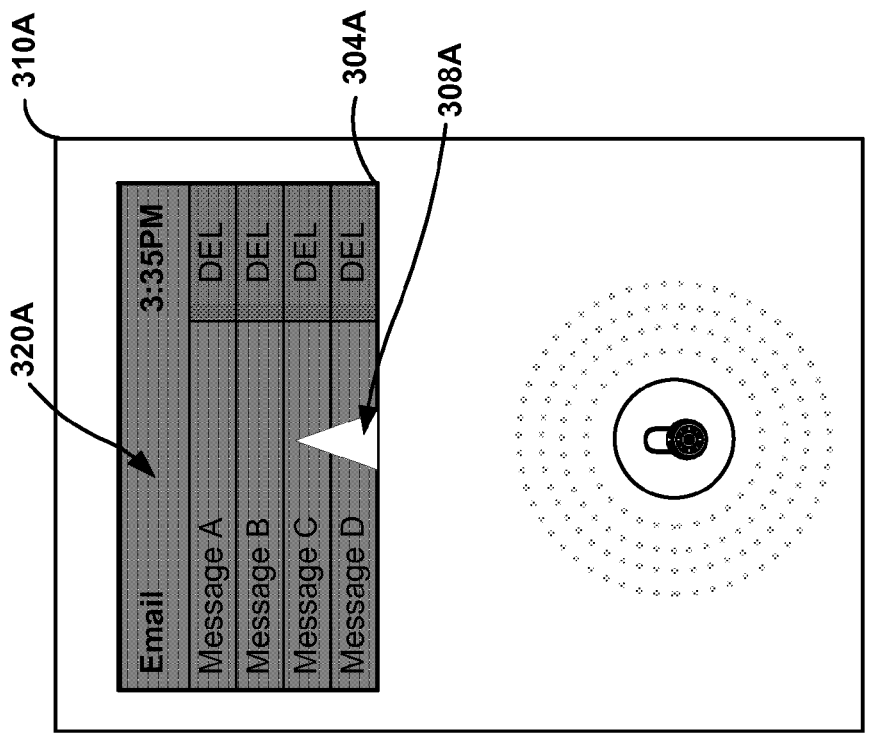

FIG. 3A illustrates user interface 310A that includes a widget region, an unlock region, widget 320A (i.e., an e-mail widget) within the widget region, and overlay 304A that at least partially obscures widget 320A. FIG. 3A further illustrates that input module 24 may receive information about an indication of a user input detected by computing device 10. Input module 24 may determine a characteristic of the user input. UI module 20 may compare the characteristic of the user input to a threshold and determine the user input does not satisfy the threshold. UI module 20 may refrain from modifying user interface 310A based on the characteristic of the user input not exceeding the threshold. For instance, the start location of the user input may not approximately correspond to a location of screen 13 presents white triangle 308A. Overlay 304A that at least partially obscures widget 320A may prevent a user from interacting (e.g., deleting e-mails) with widget 320A.

FIG. 3B illustrates user interface 310B that includes a widget region, an unlock region, widget 320B (i.e., an e-mail widget) within the widget region, and an overlay 304B that at least partially obscures the widget. FIG. 3B illustrates that input module 24 may receive information about an indication of a user input detected by computing device 10. Input module 24 may determine a characteristic of the user input. For example, input module 24 may determine the user input represents a gesture input detected at a location of screen 13 where screen 13 presents white triangle 308B of overlay 304B. In determining the characteristic of the gesture, input module 24 may determine the start location of the gesture, the length of the gesture, the velocity of the gesture, and the shape of the gesture.

UI module 20 may compare the characteristic of the gesture input to a threshold and determine the gesture input satisfies the threshold. For example, input module 24 may indicate to UI module 20 that the user input represents a gesture. UI module 20 may compare the shape of the gesture to a shape component the threshold (e.g., to determine the shape of the gesture represents a linear and vertical shape), the velocity of the gesture to a velocity component of the threshold, etc. UI module may compare characteristic of the gesture to each of component of the threshold, determine the characteristic of the gesture input satisfies each of the threshold components, and therefore determine the characteristic of the gesture satisfies the threshold. In response to determining the gesture user input satisfies the threshold, UI module 20 may remove overlay 304B from user interface 310B. FIG. 3B illustrates overlay 304B slide transitioning out of user interface 310B.

Figure 3D:
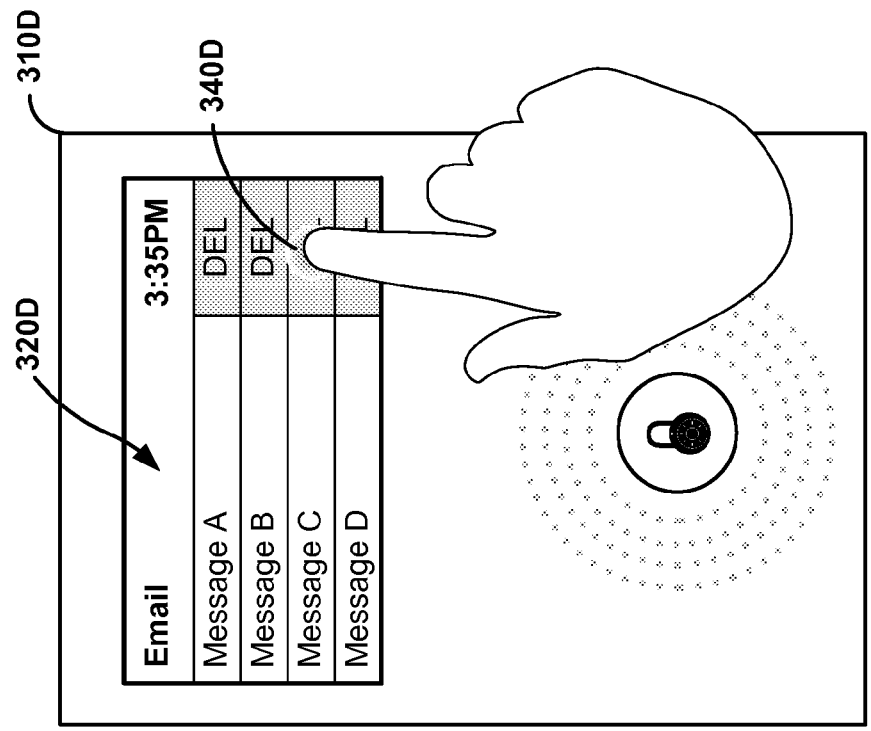
Figure 3C:
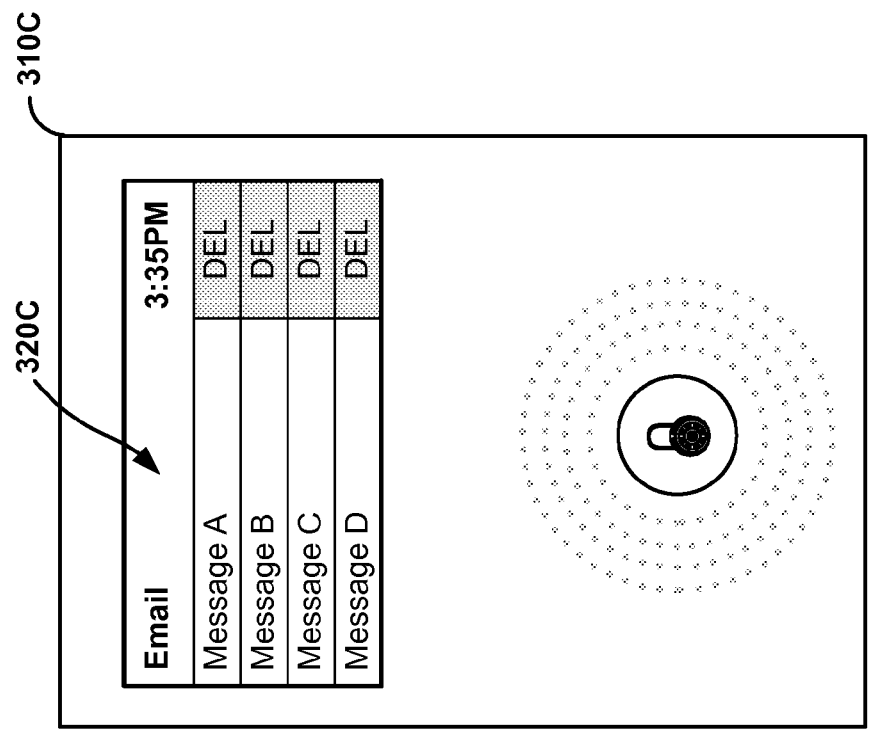

FIG. 3C illustrates user interface 310C that includes a widget region, an unlock region, and widget 320C (i.e., an e-mail widget) within the widget region. FIG. 3C further illustrates that UI module 20 removed the overlay (previously included in FIGS. 3A and 3B as overlay 304A and 304B) from user interface 310C in response to receiving user input with a characteristic that satisfies a threshold. With the overlay removed, a user may interact with the content of widget 320C, for example, by selecting an e-mail message to view or delete.

FIG. 3D illustrates a user of computing device 10 interacting with the content of widget 320D included in a widget region of user interface 310D. For example, the user may input gesture 340D. Widget 320D may receive an indication of gesture 340D from UID 12 of computing device 10 and delete an e-mail presented at screen 13.

Figure 4:
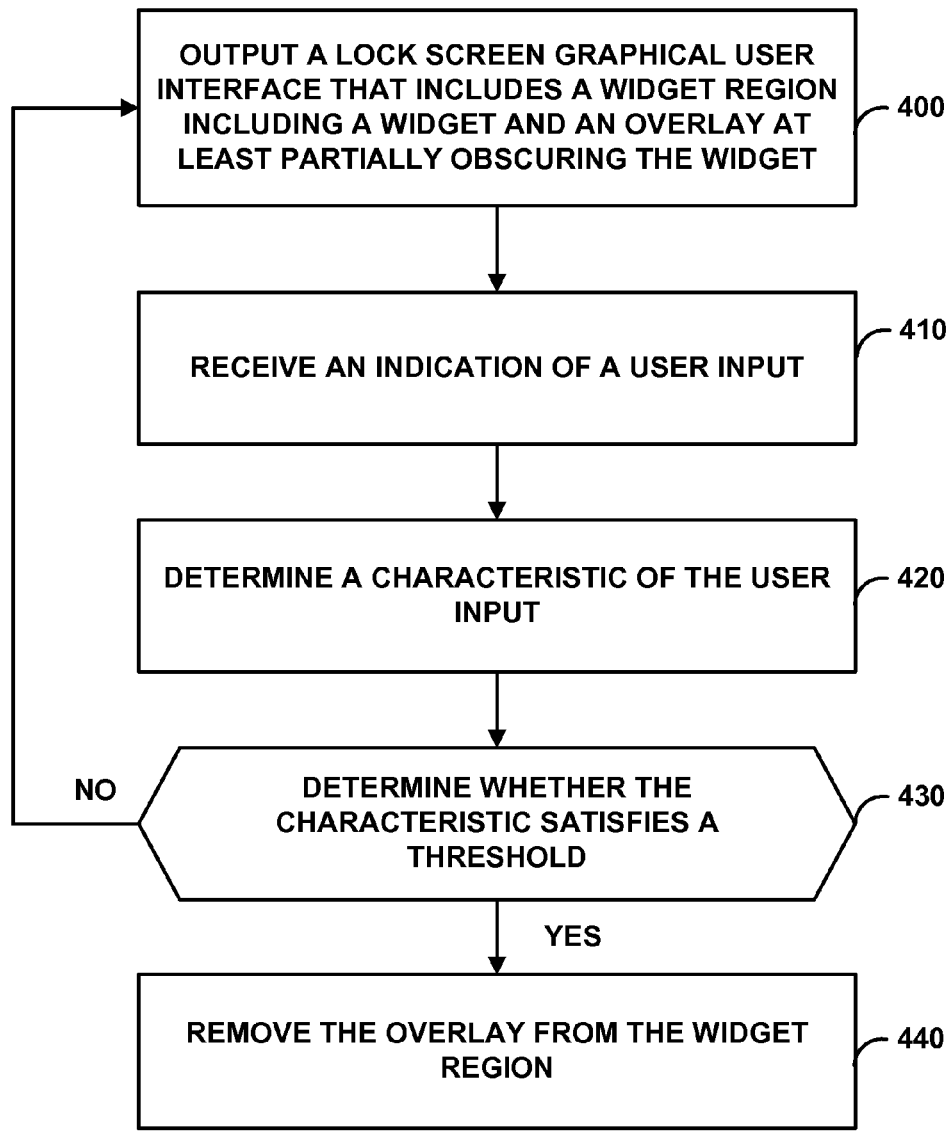
FIG. 4 is a flowchart illustrating an example operation of the computing device, in accordance with one or more aspects of the present disclosure.

FIG. 4 is a flowchart illustrating an example operation of the computing device, in accordance with one or more aspects of the present disclosure. The process of FIG. 4 may be performed by one or more processors of a computing device, such as computing device 10 illustrated in FIG. 1 and FIG. 2. For purposes of illustration, FIG. 4 is described below within the context of computing devices 10 of FIG. 1 and FIG. 2.

Computing device 10 may output a lock screen graphical user interface that includes a widget region including a widget and an overlay at least partially obscuring the widget (400). For example, in a limited state of computing device 10, UI module 20 of computing device 10 may output at a presence-sensitive screen of UID 12, user interface 14 that includes widget region 16, widget 6, overlay 4, and unlock region 18. Overlay 4 may be at least partially transparent. Computing device 10 may receive an indication of a user input (410). For example, input module 24 may receive information about a user input detected by UID 12. Input module 24 may determine UID 12 transmitted the information about the user input to input module 24 and further determine the user input represents a gesture input. Input module 24 may call on gesture module 26 to determine a characteristic of the gesture input.

Computing device 10 may determine a characteristic of the user input (420). For example, gesture module 26 may determine a sequence of motion events based on at least a portion of the user input. Each motion event in the sequence may include a location component, a time component, and an action component. Based on the sequence of motion events, gesture module 26 may determine a characteristic of the user input that includes a shape, a length, a velocity, and an acceleration of the user input.

Computing device 10 may determine whether the characteristic satisfies a threshold (430). For example, UI module 20 of computing device 10 may compare the characteristic of the user input to a threshold. UI module 20 may compare the velocity component, the acceleration component, the length component, and the shape component of the characteristic to a corresponding velocity threshold, acceleration threshold, length threshold, and shape threshold. If the characteristic does not satisfy a threshold, computing device 10 may refrain from performing further operations in response to the user input. However if the characteristic does satisfy the threshold, computing device 10 may remove the overlay from the widget region (440). For example, if UI module 20 determines the each of the velocity component, the acceleration component, the length component, and the shape component of the characteristic satisfy a respective threshold, than UI module 20 may determine the characteristic satisfies the threshold. In response, UI module 20 may cause UID 12 to present an updated widget region 16 of user interface 14 with overlay 4 removed.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method comprising:
   outputting, by a computing device and for display, a lock screen graphical user interface, the lock screen graphical user interface including a widget region and an unlock region, the widget region including a widget and an overlay that appears to at least partially obscure the widget, wherein the overlay is at least partially transparent, wherein the computing device operates in a limited access state while outputting the overlay for display, wherein the limited access state comprises an operation state of the computing device from which a user associated with the computing device cannot access protected information or applications stored on the computing device, and wherein the widget comprises a component of the lock screen graphical user interface from which the user can cause the computing device to perform a function, execute an application, or accesses a service while the computing device operates in the limited access state;

while outputting, for display, a visual indication of a suggested input, receiving, at the computing device, an indication of a user input;

determining, by the computing device, a characteristic of the user input; and responsive to determining that the determined characteristic satisfies a threshold, removing, by the computing device, the overlay from the widget region, wherein a feature of the suggested input corresponds to the determined characteristic of the user input that satisfies the threshold, wherein the computing device continues to operate in the limited access state after removing the overlay from the widget region.

2. The method of claim 1, wherein the user input comprises a gesture input received at a presence-sensitive screen, and wherein the determined characteristic of the gesture input comprises at least one of a shape, a length, a velocity, and an acceleration.

3. The method of claim 2, wherein the threshold includes a length threshold proportional to a width of the presence-sensitive screen and determining that the determined characteristic satisfies a threshold further comprises:
determining, by the computing device, the length of the determined characteristic of the gesture input satisfies the length threshold.

4. The method of claim 2, wherein the threshold includes a velocity threshold and determining that the determined characteristic satisfies a threshold further comprises:
determining, by the computing device, the velocity of the determined characteristic of the gesture input satisfies the velocity threshold.

5. The method of claim 2, wherein the gesture input comprises a gesture input received at a location of the presence-sensitive screen at which the overlay is displayed.

6. The method of claim 2, further comprising:
determining, by the computing device and based at least in part on a portion of the gesture input, a time-ordered sequence of motion events, each motion event in the sequence of motion events comprising a location component, a time component, and an action component; and
determining, by the computing device and based at least in part on the location components of the motion events in the sequence of motion events, the length of the determined characteristic of the gesture input.

7. The method of claim 6, further comprising:
determining, by the computing device, the velocity of the determined characteristic of the gesture input based on a ratio between the length of the determined characteristic of the gesture input and a difference in time between the time components of the last motion event and the first motion event in the sequence.

8. The method of claim 6, wherein the determined characteristic of the gesture input comprises a tap frequency and the threshold includes a tap frequency threshold, the method further comprising:

determining, by the computing device and based at least in part on the sequence of motion events, a quantity of tap inputs received within a predefined area of the presence-sensitive screen;

determining, by the computing device, the tap frequency of the determined characteristic of the gesture input based on a ratio between the quantity of tap inputs and a difference in time between the time components of the last motion event and the first motion event in the sequence; and determining, by the computing device, that the tap frequency of the determined characteristic of the gesture input satisfies the tap frequency component of the threshold.

9. The method of claim 1, wherein the user input comprises a gesture input received at a location of the presence-sensitive screen at which the overlay is displayed, and wherein the feature of the suggested input comprises at least one of a gesture length, a gesture shape, a gesture velocity, and a gesture acceleration.

10. The method of claim 1, wherein removing the overlay from the widget region further comprises:
outputting, by the computing device, and for display, at least one of a slide transition, a vertical blinds transition, a broken glass transition, and a fade transition.

11. The method of claim 1, wherein the user input comprises a sensor input detected by a sensor device and the determined characteristic of the sensor input comprises at least one of an acceleration of the computing device, an orientation of the computing device, an ambient light measurement within a predefined distance from the computing device, a physical distance between an object and the computing device, and a barometric pressure reading.

12. The method of claim 11, wherein the sensor device comprises at least one of an accelerometer, a gyro, an ambient light sensor, a proximity sensor, and a barometer.

13. The method of claim 1, wherein the user input comprises a button input detected by a physical switch and the determined characteristic of the button input comprises a state of the physical switch.

14. The method of claim 1, further comprising:
in response to determining that the widget is a non-interactive widget or a limited interactive widget, refraining from outputting for display, by the computing device, the overlay within the widget region.

15. The method of claim 1, wherein the user input comprises a first gesture input received at a first location of a presence-sensitive screen at which the widget region is displayed, the method further comprising:
in response to receiving an indication of a second gesture input received at a second location of the presence-sensitive screen at which the unlock region is displayed, transitioning, by the computing device and based at least in part on the second gesture input, from the limited access state to a full access state.

16. The method of claim 1, wherein the first widget is a customizable widget from a widget repository.

17. A computing device comprising one or more processors, the one or more processors being configured to:
output, for display, a lock screen graphical user interface, the lock screen graphical user interface including a widget region and an unlock region, the widget region including a widget and an overlay that at least partially obscures the widget, wherein the overlay is at least partially transparent, wherein the computing device operates in a limited access state while the overlay is output for display, wherein the limited access state comprises an operation state of the computing device from which a user associated with the computing device cannot access protected information or applications stored on the computing device, and wherein the widget comprises a component of the lock screen graphical user interface from which the user can cause the computing device to perform a function, execute an application, or accesses a service while the computing device operates in the limited access state;

output, for display, a visual indication of a suggested input;

while outputting the visual indication, receive an indication of a user input;

determine a characteristic of the user input; and responsive to determining that the determined characteristic satisfies a threshold, remove the overlay from the widget region, wherein a feature of the suggested input corresponds to the determined characteristic of the user input that satisfies the threshold, wherein the computing device continues to operate in the same limited access state after the overlay is removed from the widget region.

18. A computer-readable storage medium comprising instructions that, when executed, configure one or more processors of a computing device to:

output, for display, a lock screen graphical user interface, the lock screen graphical user interface including a widget region and an unlock region, the widget region including a widget and an overlay that at least partially obscures the widget, wherein the overlay is at least partially transparent, wherein the computing device operates in a limited access state while the overlay is output for display, wherein the limited access state comprises an operation state of the computing device from which a user associated with the computing device cannot access protected information or applications stored on the computing device, and wherein the widget comprises a component of the lock screen graphical user interface from which the user can cause the computing device to perform a function, execute an application, or accesses a service while the computing device operates in the limited access state;

output, for display, a visual indication of a suggested input;

while outputting the visual indication, receive an indication of a user input;

determine a characteristic of the user input; and responsive to determining that the determined characteristic satisfies a threshold, remove the overlay from the widget region, wherein a feature of the suggested input corresponds to the determined characteristic of the user input that satisfies the threshold, wherein the computing device continues to operate in the same limited access state after the overlay is removed from the widget region.

* * * * *